(12) United States Patent
Yang

(10) Patent No.: US 12,713,428 B2
(45) Date of Patent: Aug. 18, 2026

(54) DATA TRANSMISSION SCHEDULING METHOD AND DEVICE, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 565 days.

(21) Appl. No.: 17/996,890

(22) PCT Filed: Apr. 30, 2020

(86) PCT No.: PCT/CN2020/088331
§ 371 (c)(1),
(2) Date: Oct. 21, 2022

(87) PCT Pub. No.: WO2021/217595
PCT Pub. Date: Nov. 4, 2021

(65) Prior Publication Data

US 2023/0156703 A1 May 18, 2023

(51) Int. Cl.

| | |
|---|---|
| ***H04W 72/1273*** | (2023.01) |
| ***H04W 72/21*** | (2023.01) |
| ***H04W 72/23*** | (2023.01) |
| ***H04W 76/20*** | (2018.01) |

(52) U.S. Cl.
CPC ....... *H04W 72/1273* (2013.01); *H04W 72/21* (2023.01); *H04W 72/23* (2023.01); *H04W 76/20* (2018.02)

(58) Field of Classification Search
CPC . H04W 72/1273; H04W 72/23; H04W 72/21; H04W 76/20; H04W 28/06;
(Continued)

(56) References Cited

U.S. PATENT DOCUMENTS

2011/0077040 A1* 3/2011 Nammi ................ H04B 7/0619 455/507
2013/0034187 A1* 2/2013 Taoka .................. H04B 7/0452 375/296

(Continued)

FOREIGN PATENT DOCUMENTS

CN 102237908 A 11/2011
CN 102291224 A 12/2011

(Continued)

OTHER PUBLICATIONS

International Search Report and Written Opinion of International Application No. PCT/CN2020/088331, mailed Jan. 27, 2021, 14 pages.

(Continued)

*Primary Examiner* — Rasheed Gidado
(74) *Attorney, Agent, or Firm* — Finnegan, Henderson, Farabow, Garrett & Dunner, L.L.P.

(57) ABSTRACT

A method for scheduling data transmission is performed by a base station, and includes: sending feedback indication information to a user equipment (UE), wherein the feedback indication information is configured to indicate whether the UE provides a transmission feedback for a downlink transmission with the UE as a destination address.

16 Claims, 6 Drawing Sheets

(58) Field of Classification Search
CPC ... H04L 5/0055; H04L 5/0053; H04L 1/1685; H04L 1/1896
See application file for complete search history.

(56) References Cited

U.S. PATENT DOCUMENTS

| | | | | |
|---|---|---|---|---|
| 2019/0387528 | A1* | 12/2019 | Koyanagi | H04W 76/50 |
| 2020/0296703 | A1* | 9/2020 | Ji | H04L 1/0004 |
| 2020/0359372 | A1* | 11/2020 | Du | H04L 1/1812 |
| 2020/0404682 | A1* | 12/2020 | Zhou | H04W 72/23 |
| 2022/0263608 | A1* | 8/2022 | Wei | H04L 1/1896 |

FOREIGN PATENT DOCUMENTS

| | | | |
|---|---|---|---|
| CN | 106937257 | A | 7/2017 |
| CN | 110636549 | A | 12/2019 |
| CN | 110945815 | A | 3/2020 |
| EP | 3480987 | A1 | 5/2019 |
| EP | 2127177 | B1 | 6/2019 |
| WO | WO 2019098937 | A1 | 5/2019 |
| WO | WO 2020068973 | A1 | 4/2020 |

OTHER PUBLICATIONS

The Second Office Action for Chinese Application No. 202080000843.5, dated Jun. 5, 2023, 13 pages.
European Patent Office, Extended European Search Report issued in Application No. 20933417.6 dated Jan. 3, 2024, 12 pages.
The Fourth Office Action issued by the State Intellectual Property Office of People's Republic of China on May 30, 2025, in corresponding Application No. CN 202080000843.5, 14 pages.

* cited by examiner

DATA TRANSMISSION SCHEDULING METHOD AND DEVICE, AND STORAGE MEDIUM

CROSS-REFERENCE TO RELATED APPLICATION

This application is the U.S. national phase application of International Application No. PCT/CN2020/088331 filed on Apr. 30, 2020, the entire disclosure of which is incorporated herein by reference.

TECHNICAL FIELD

The disclosure relates to a field of communication technologies, in particular to a method for scheduling data transmission, a device for scheduling data transmission, and a storage medium.

BACKGROUND

In the related art, a User Equipment (UE) sends a Hybrid Automatic Repeat reQuest (HARQ) feedback after receiving a downlink transmission with a Cell-Radio Network Temporary Identity (C-RNTI) as a destination address from a base station. In a New Technology Network (NTN), the base station may be hundreds to tens of thousands of kilometers from the UE, with a Round-Trip Time (RTT) of 12 ms to 500 ms. The coverage area of each cell can be large, for example, the coverage area can reach hundreds of square kilometers. The difference in RTT for different UEs in the same cell can be a range from 3 ms to 10 ms.

SUMMARY

According to a first aspect of the disclosure, a method for scheduling data transmission is performed by a base station. The method includes: sending feedback indication information to a UE, in which the feedback indication information is configured to indicate whether the UE provides a transmission feedback for a downlink transmission with the UE as a destination address.

According to a second aspect of the disclosure, a method for scheduling data transmission is performed by a UE. The method includes: receiving feedback indication information from a base station; and determining whether to provide a transmission feedback for a downlink transmission with the UE as a destination address based on the feedback indication information.

According to a third aspect of the disclosure, a UE includes: a processor; and a memory for storing instructions executable by the processor. The processor is configured to: receive feedback indication information from a base station; and determine whether to provide a transmission feedback for a downlink transmission with the UE as a destination address based on the feedback indication information.

DETAILED DESCRIPTION

Reference will now be made in detail to the embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

When a service needs a relatively short delay, even if the base station sends retransmitted data based on the transmission feedback from the UE, the retransmitted data may be still discarded, resulting in a waste of wireless resources.

Figure 1:
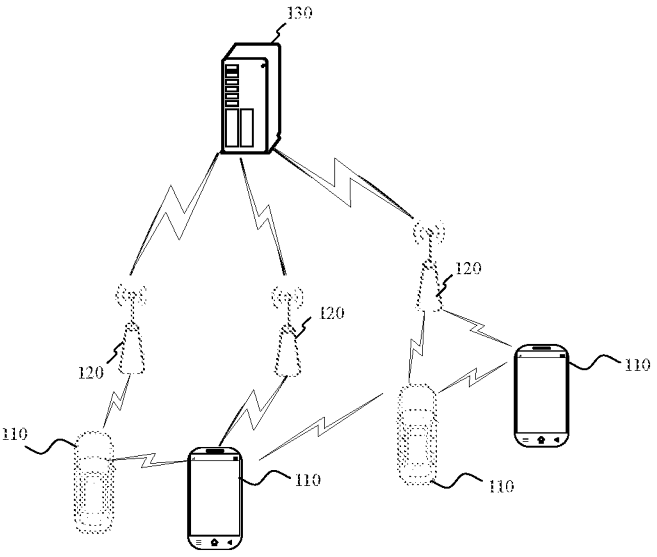
FIG. 1 is a structural schematic diagram of a wireless communication system.

FIG. 1 is a structural schematic diagram of a wireless communication system according to an embodiment. As illustrated in FIG. 1, the wireless communication system is a communication system based on cellular mobile communication technology, and the wireless communication system may include: a plurality of UEs 110 and base stations 120.

The UE 110 may be a device that provides voice and/or data connectivity to a user. The UE 110 may communicate with one or more core networks via a Radio Access Network (RAN). The UE 110 may be an Internet of Things (IoT) UE, such as a sensor device, a mobile phone (or a "cellular" phone) and a computer with the IoT UE. The UE 110 may be a fixed, portable, pocket, hand-held, built-in computer or a vehicle-mounted device, for example, a Station (STA), a subscriber unit, a subscriber station, a mobile station, a mobile, a remote station, an access point, a remote terminal, an access terminal, a user terminal, a user agent, a user device, or a UE. Alternatively, the UE 110 may also be a device of an unmanned aerial vehicle. Alternatively, the UE 110 may also be a vehicle-mounted device, for example, an Engine Control Unit (ECU) with a wireless communication function, or a wireless UE externally connected to the ECU. Alternatively, the UE 110 may also be a roadside device, for example, a street light, a signal light, or other roadside devices with a wireless communication function.

The base station 120 may be a network-side device in the wireless communication system. The wireless communication system may be the 4th generation mobile communication (4G) system, also known as a Long Term Evolution (LTE) system. Alternatively, the wireless communication system may also be the 5th generation mobile communication (5G) system, also known as a New Radio (NR) system or 5G NR system. Alternatively, the wireless communication system may also be a next-generation system of the 5G system. The access network in the 5G system may be called New Generation-Radio Access Network (NG-RAN).

The base station 120 may be an evolved base station (eNB) employed in the 4G system. Alternatively, the base station 120 may also be a generation base station (gNB) that adopts a centralized distributed architecture in the 5G system. When the base station 120 adopts the centralized distributed architecture, it usually includes a Central Unit (CU) and at least two Distributed Units (DUs). The CU is provided with protocol stacks of a Packet Data Convergence Protocol (PDCP) layer, a Radio Link Control (RLC) layer, and a Media Access Control (MAC) layer. A physical (PHY) layer protocol stack is set in the DU. The specific implementation manner of the base station 120 is not limited in this embodiment of the disclosure.

A wireless connection can be established between the base station 120 and the UE 110 through a radio air interface. In different embodiments, the radio air interface is a radio air interface based on the 4G standard. Alternatively, the radio air interface is a radio air interface based on the 5G standard, for example, the radio air interface is the NR. Alternatively, the radio air interface may also be a radio air interface based on a next generation of the 5G standard.

In some embodiments, an End to End (E2E) connection may also be established between the UEs 110, for example, scenes of vehicle to vehicle (V2V) communication, Vehicle to infrastructure (V2I) communication and Vehicle to Pedestrian (V2P) communication in Vehicle to every thing (V2X) communication.

The UE described above may be considered to be the terminal device in the following embodiments.

In some embodiments, the above wireless communication system may further include a network management device 130.

A plurality of base stations 120 are connected to the network management device 130 respectively. The network management device 130 may be a core network device in the wireless communication system, for example, the network management device 130 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 130 is not limited in this embodiment of the disclosure.

Figure 2:
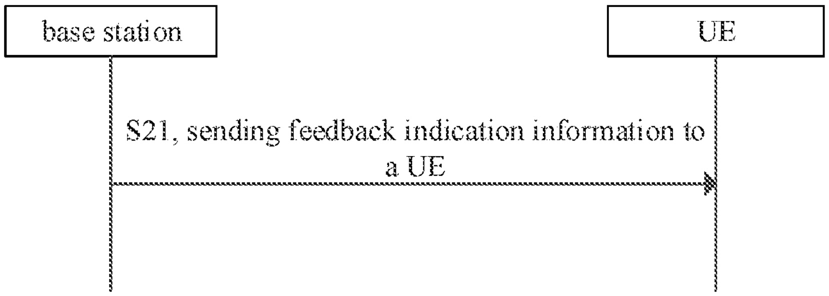
FIG. 2 is a flowchart of a method for scheduling data transmission according to an embodiment.

As illustrated in FIG. 2, this embodiment provides a method for scheduling data transmission, applicable to a base station. The method includes the following step at S21.

At S21, feedback indication information is sent to a user equipment (UE).

The feedback indication information is used to indicate whether the UE provides a transmission feedback for a downlink transmission with the UE as a destination address.

The base station is an interface device for the UE to access the Internet. The base station may be of various types, for example, a 3G base station, a 4G base station, a 5G base station or oilier evolved base station.

The UE may be a mobile phone, a computer, a server, a transceiver device, a tablet device or a medical device.

The identifier (ID) of the UE includes at least one of the following:

a C-RNTI;

a Configured Scheduling-RNTI (CS-RNTI); and a Temporary C-RNTI (T-CRNTI).

In the embodiment of the disclosure, the ID of the UE may be carried in the feedback indication information. After receiving the feedback indication information, the UE determines whether the ID of the UE carried in the feedback indication information is its own ID. For example, the UE determines whether the carried ID is its own ID, such as C-RNTI, CS-RNTI or T-CRNTI, and if so, the UE determines that the received feedback indication information is feedback indication information for the UE itself.

Certainly, in other embodiments, the ID of the UE may also be a string of characters. The ID of the UE is not limited in this embodiment of the disclosure, but needs to be able to uniquely identify the UE.

In the embodiment of the disclosure, the base station sends the feedback indication information to the UE, and the feedback indication information is used to indicate whether the UE provides the transmission feedback for the downlink transmission with the UE as a destination address. In this embodiment of the disclosure, when the base station sends the downlink data to the UE, the UE does not have to always provide the transmission feedback for the downlink transmission with the UE as the destination address, while the UE is enabled to determine whether to provide the transmission feedback for the downlink transmission with the UE as the destination address based on the feedback indication information from the base station. Therefore, the method may reduce the waste of wireless resources caused by providing the unnecessary transmission feedback for the downlink transmission with the UE as the destination address.

Moreover, the method further facilitates to reduce the waste of radio resources caused by the base station retransmitting the downlink data based on the transmission feedback.

Figure 3:
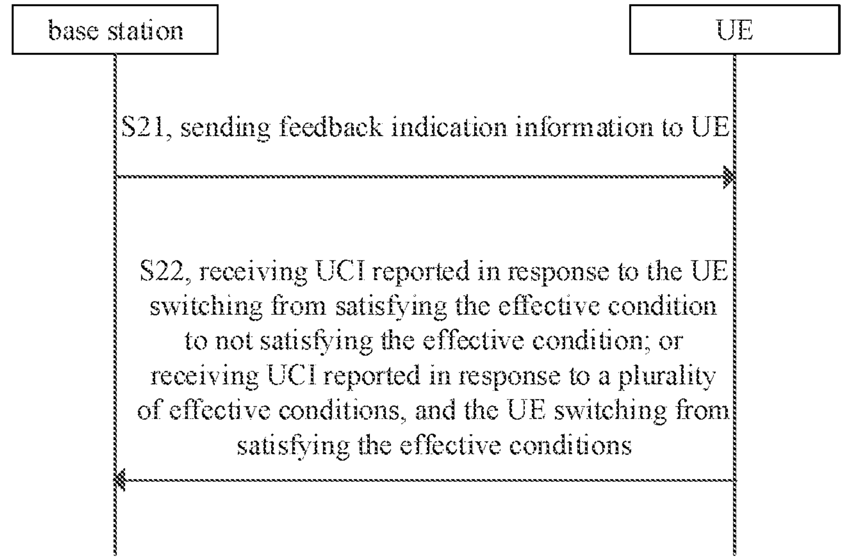
FIG. 3 is a flowchart of a method for scheduling data transmission according to an embodiment.

As illustrated in FIG. 3, in some embodiments, the step at S21 further includes: the following step at S211.

At S211, an effective condition for the feedback indication information is sent to the UE.

There are one or more effective conditions.

In some embodiments, the effective condition includes at least one of the following:

a distance effective condition, configured to define the feedback indication information is validated in response to a transmission distance between the UE and a base station being less than or equal to a distance threshold value;

a delay effective condition, configured to define the feedback indication information is validated in response to a transmission duration of the downlink transmission being less than or equal to a delay threshold value; or an area effective condition, configured to define the feedback indication information is validated in response to an area identifier of the UE being a preset area identifier.

In some embodiments, the delay effective condition is configured to define the feedback indication information is validated when the duration of the downlink transmission is less than or equal to the delay threshold value. In other embodiments, the delay effective condition may be configured to define the feedback indication information is validated when a sum of the duration of the downlink transmission and the duration of the uplink transmission is less than or equal to the delay threshold value.

In the embodiment of the disclosure, the area ID is used to uniquely identify a geographic location of the UE.

In the embodiment of the disclosure, the area ID of the UE is determined based on a latitude and longitude of the UE.

In another embodiment of the disclosure, the area ID of the UE is determined based on a length and a width of the UE in a target area. The target area here is an area containing the UE and the base station.

In the embodiment of the disclosure, when there is one effective condition sent to the UE, there is no need to send an identifier of the effective condition used for determining whether the transmission feedback is provided to the UE. When there are multiple effective conditions sent to the UE, there is a need to send identities of the effective conditions used for determining whether the transmission feedback is provided to the UE.

For example, in some embodiments, the step at S211 includes:

issuing downlink control information (DCI) carrying an identifier of the effective condition.

The identifier of the effective condition is carried in at least one bit of the DCI.

For example, in an application scenario, the base station configures one distance effective condition for the UE. The base station sends this distance effective condition to the UE. In this way, the UE obtains this distance effective condition and the UE determines by default whether to provide the transmission feedback based on this distance effective condition. Thus, the base station does not need to continue to send DCI to indicate which effective condition is used by the UE for determining whether to provide the transmission feedback.

For another example, in another application scenario, the base station configures two distance effective conditions and one delay effective condition for the UE. The base station sends the two distance effective conditions and the delay effective condition to the UE. In this way, since the UE will receive the two distance effective conditions and one delay effective condition, the UE needs to determine which effective condition is used for determining whether to provide a transmission feedback. In this way, the base station also needs to issue DCI or other information, such as broadcast information, to indicate an effective condition used when the UE determines whether to provide the transmission feedback.

For example, when the two distance effective conditions and the one delay effective condition in the above application scenario are a first distance effective condition, a second distance effective condition and a third delay effective condition, the identifier of the first distance effective condition is "00", the identifier of the second distance validity condition is "01" and the identifier of the third delay effective condition is identified as "10". The base station sends the DCI to the UE, in which "10" is carried in two bits of the DCI. In this way, when the UE receives the DCI, it is possible to determine whether the UE provides the transmission feedback for the downlink transmissions with the UE as the destination address based on the third delay effective condition.

The identifier number of effective conditions in the DCI is the same as the number of the effective conditions issued to the UE.

In some embodiments, the step at S211 includes:

sending a radio resource control (RRC) reassignment message carrying the effective condition to the UE; or, broadcasting a system message carrying the effective condition.

In the embodiment of the disclosure, the effective condition is sent to the UE via the RRC reassignment message, which enables the reuse of the RRC reassignment message and improves the signaling compatibility.

Alternatively, in this embodiment of the disclosure, the effective condition can also be sent to multiple UEs in the cell via a broadcast message. In this way, there is no need to send signaling or information about the effective condition to each UE, thus saving resources.

Furthermore, when a plurality of effective conditions are broadcasted, for different UEs, it is also possible to cause the base station to send different DCI for the different UEs. The DCI carries the identifier of the effective condition under which the UE actually determines whether to provide the transmission feedback, which also allows the UE to know which effective condition may be used for determining whether or not to provide the transmission feedback.

In the embodiments of the disclosure, the effective condition may be the basis of the UE determining whether to provide the transmission feedback for the downlink transmission or the next downlink transmission. Alternatively, the effective condition may be the basis of the UE determining whether to provide the transmission feedback for the downlink transmission within a predetermined time range.

As illustrated in FIG. 3, in some embodiments, the method further includes the following step at S22.

At S22, uplink control information (UCI) is received, in which the UCI is reported in response to the UE switching from satisfying the effective condition to not satisfying the effective condition; or, UCI reported in response to a plurality of effective conditions, and the UE switching from satisfying the effective conditions is received.

For example, in an application scenario, the base station sends a distance effective condition to the UE. The distance effective condition is that when the transmission distance between the base station and the UE is 20 km or less, the UE provides a transmission feedback for downlink transmissions with the UE as a destination address. For example, when the transmission distance is 19 km, it is considered that the distance effective condition is satisfied for the UE. After a period of time, the UE has moved a certain distance, and the distance between the UE and the base station is 21 km. At this time, the UE does not satisfy the distance effective condition. The base station may receive UCI sent by the UE, where the UCI carries information that the UE does not satisfy the distance effective condition.

For example, in an application scenario, the base station sends two distance effective conditions to the UE. The first distance effective condition is that when the transmission distance between the base station and the UE is less than 60 km, the UE provides a transmission feedback for a downlink transmission with the UE as a destination address. The second distance effective condition is that when the transmission distance between the base station and the UE is 60 to 70 km, the UE provides a transmission feedback for a downlink transmission with the UE as a destination address. When the transmission distance is 55 km, the UE satisfies the first distance effective condition. After a period of time, the UE has moved a certain distance, and the transmission distance between the UE and the base station is 65 km. At this time, the UE satisfies the second distance effective condition. The base station may receive UCI sent by the UE, where the UCI carries information that the UE satisfies the second distance effective condition. In an embodiment, the UCI carries the identifier of the second distance effective condition.

In this way, in the embodiment of the disclosure, when the base station receives the UCI, it may know whether or not the UE satisfies the effective condition or which effective condition is satisfied for the UE, thus facilitating the base station to monitor the transmission feedback from the UE. For example, when the UCI carries the information that the UE does not satisfy the effective condition, the base station may no longer monitor the transmission feedback from the UE, thus further reducing the waste of wireless resources. For another example, when the UCI carries an identifier of the effective condition that the UE satisfies, it may enable the base station to continue monitoring the transmission feedback from the UE, so as to reduce occurrence of a situation where the downlink data is not retransmitted due to the base station missing the transmission feedback monitored from the UE, thus improving the transmission quality of the downlink data.

Figure 4:
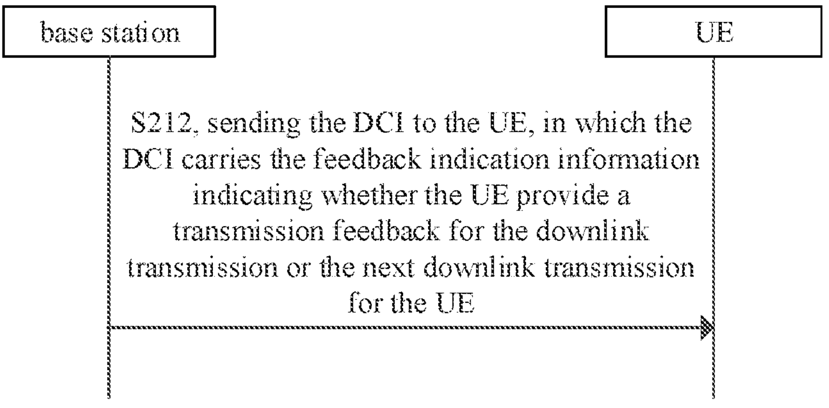
FIG. 4 is a flowchart of a method for scheduling data transmission according to an embodiment.

As illustrated in FIG. 4, in some embodiments, the step at S21 includes the following step at S212.

At S212, the DCI is sent to the UE, in which the DCI carries the feedback indication information. The feedback indication information indicates the UE provide a transmission feedback for the downlink transmission or the next downlink transmission for the UE.

The feedback indication information may be carried in at least one bit of the DCI.

In the embodiment of the disclosure, the indication feedback information carried in the DCI may instruct the UE to provide a transmission feedback for the current downlink transmission or the next downlink transmission for the UE through. In other embodiments, the indication feedback information carried in the DCI may also be used to instruct the UE not to provide a transmission feedback for the current downlink transmission or the next downlink transmission for the UE.

For example, the feedback indication information is carried by one bit of the DCI. When the feedback indication information is "0", it is used to instruct the UE not to provide the transmission feedback for the current downlink transmission or the next downlink transmission for the UE. When the feedback indication information is "1", it is used to instruct the UE to provide the transmission feedback for the current downlink transmission or the next downlink transmission for the UE. In other examples, the feedback indication information may also be carried by 2 bits or 3 bits.

In the embodiment of the disclosure, a method in which the base station directly controls the UE to provide a transmission feedback for the downlink transmission or the next downlink transmission for the UE is provided, without a need of sending an effective condition to make the UE determine whether to send a transmission feedback. As such, the transmission of downlink data is reduced and the transmission resources of the system is saved. Meanwhile, there is no need for the UE to determine whether to provide a transmission feedback based on the effective condition, thus the power consumption or resources for the UE to determine whether to provide the transmission feedback can also be saved.

It should be noted that the following method for scheduling data transmission applied to the UE is similar to the description of the method for scheduling data transmission applied to the base station. For technical details that are not disclosed in the embodiments of the method applied to the UE in the disclosure, refer to the description of the embodiments of the method applied to the base station in the disclosure, and will not be described in detail here.

Figure 5:
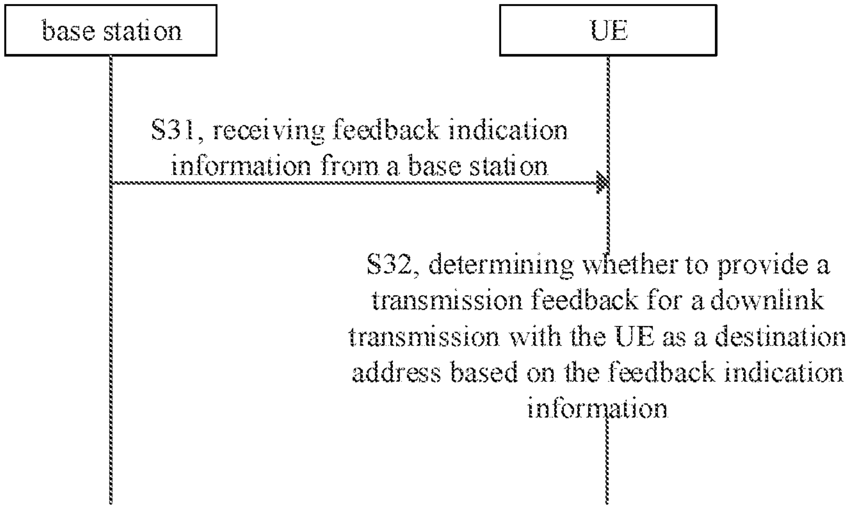
FIG. 5 is a schematic diagram of a method for scheduling data transmission according to an embodiment.

As illustrated in FIG. 5, the method for scheduling data transmission applicable to a UE is provided according to the embodiment of the disclosure. The method includes the following steps at S31-S32.

At S31, feedback indication information from a base station is received.

At S32, it is determined whether to provide a transmission feedback for a downlink transmission with the UE as a destination address based on the feedback indication information.

In some embodiments, the step at S32 includes: determining to provide the transmission feedback for the downlink transmission with the UE as the destination address based on the feedback indication information.

In some embodiments, the step at S32 includes: determining not to provide the transmission feedback for the downlink transmission with the UE as the destination address based on the feedback indication information.

In some embodiments, the step at S31 includes: receiving an effective condition for the feedback indication information from the base station.

In some embodiments, receiving the effective condition for the feedback indication information from the base station, includes: receiving one or more effective condition from the base station.

In some embodiments, receiving the effective condition for the feedback indication information from the base station, includes: receiving a RRC reassignment message from the base station, in which the RRC reassignment message carries the effective condition: or, receiving a system message broadcasted by the base station, in which the system message carries the effective condition.

In some embodiments, receiving the effective condition for the feedback indication information from the base station, includes: receiving LACI carrying an identifier of the effective condition from the base station.

In some embodiments, the effective condition includes at least one of the following:

a distance effective condition, configured to define the feedback indication information is validated than or equal to a distance threshold value;

a delay effective condition, configured to define the feedback indication information is validated in response to a maximum transmission duration of the downlink transmission being less than or equal to a delay threshold value; or an area effective condition, configured to define the feedback indication information is validated in response to an area identifier of the UE being a preset area identifier.

In some embodiments, the step at S32 includes: determining to provide the transmission feedback for the downlink transmission with the UE as the destination address, in response to a transmission distance between the UE and the base station being less than or equal to the distance threshold value in the distance effective condition; or, determining not to provide the transmission feedback for the downlink transmission with the UE as the destination address, in response to a transmission distance between the UE and the base station being greater than the distance threshold value in the distance effective condition.

Therefore, in the embodiment of the disclosure, the transmission feedback is provided for downlink transmission with the UE as the destination address, when the UE is relatively close to the base station. In this way, when the base station retransmits the downlink data based on the transmission feedback, the risk is reduced that the retransmission data may be discarded by the UE even if the base station sends the retransmission data in response to the service delay being less than the transmission delay of the downlink data sent by the base station, thus reducing waste of wireless resources.

In some embodiments, the step at S32 includes: determining to provide the transmission feedback for the downlink transmission with the UE as the destination address, in response to a transmission duration of the downlink transmission from the base station being less than or equal to the delay threshold value in the delay effective condition; or determining not to provide the transmission feedback for the downlink transmission with the UE as the destination address, in response to a transmission duration of the downlink transmission from the base station being greater than the delay threshold value in the delay effective condition.

Therefore, in the embodiment of the disclosure, the transmission feedback is provided for the downlink transmission with the UE as the destination address, when the delay for the base station to send the downlink data is relatively short. In this way, when the base station retransmits the downlink data based on the transmission feedback, the risk is reduced that the retransmission data may be discarded by the UE even if the base station sends the retransmission data in response to the service delay being less than the transmission delay of the downlink data sent by the base station, thus reducing the waste of wireless resources.

In some embodiments, the step at S32 includes: determining to provide the transmission feedback for the downlink transmission with the UE as the destination address, in response to the area identifier of the UE being the preset area identifier in the effective condition; or determining not to provide the transmission feedback for the downlink transmission with the UE as the destination address, in response to the area identifier of the UE not being the preset area identifier in the effective condition.

When the area identifier is the preset area identifier, the transmission distance between the UE and the base station is less than or equal to the distance threshold value, or the transmission duration of the downlink transmission of the base station is less than or equal to the delay threshold value.

When the area identifier is not the preset area identifier, the transmission distance between the UE and the base station is greater than the distance threshold value, or the transmission duration of the downlink transmission of the base station is greater than the delay threshold value.

In this way, in the embodiments of the disclosure, the waste of wireless resources can also be reduced.

In some embodiments, the method further includes: in response to the UE switching from satisfying the effective condition to not satisfying the effective condition, report UCI indicating that the UE does not satisfy the effective condition to the base station; or, in response to a plurality of effective conditions and the UE switching from satisfying the effective conditions, report UCI indicating that the UE satisfies the effective conditions to the base station.

In some embodiments, the step at S31 includes: receiving DCI from the base station, in which the DCI carries the feedback indication information indicating the UE provide the transmission feedback for the downlink transmission or the next downlink transmission for the UE.

In some embodiments, the step at S31 includes: receiving DCI from the base station, in which the DCI carries the feedback indication information indicating the UE does not provide the transmission feedback for the downlink transmission or the next downlink transmission for the UE.

In order to facilitate understanding of the above embodiments of the disclosure, the following examples are used as examples for description.

Example 1

Figure 6:
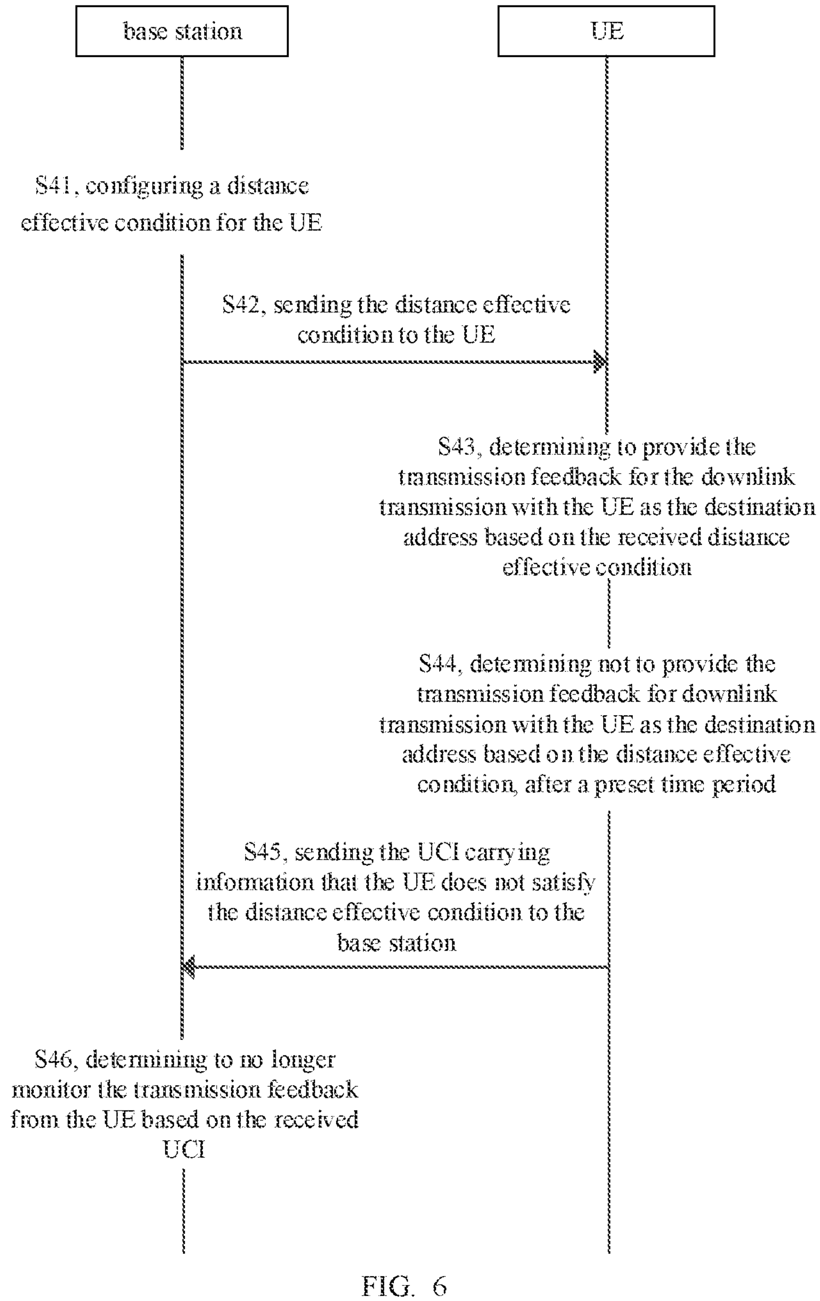
FIG. 6 is a flowchart of a method for scheduling data transmission according to an embodiment.

As illustrated in FIG. 6, a method for scheduling data transmission, applicable to a system for scheduling data transmission is provided. The system includes: a base station and a UE. The method includes the following steps at S41-S46.

At S41, a distance effective condition is configured for the UE.

The distance effective condition is that when the transmission distance between the UE and the base station is less than or equal to 70 km, the UE provides the transmission feedback for downlink transmission with the UE as the destination address.

Optionally, the base station configures a distance effective condition for the UE.

At S42, the distance effective condition is sent to the UE.

Optionally, the base station sends the distance effective condition to the UE.

At S43, it is determined to provide the transmission feedback for the downlink transmission with the UE as the destination address based on the received distance effective condition.

Optionally, the UE receives the distance effective condition from the base station. The UE determines that the UE satisfies the distance effective condition in response to the transmission distance between the UE and the base station being 69 km. The UE determines to provide the transmission feedback for the downlink transmission with the UE as the destination address.

In an optional embodiment, the UE sends the transmission feedback to the base station based on the received downlink data.

At S44, after a preset time period, it is determined not to provide the transmission feedback for downlink transmission with the UE as the destination address based on the distance effective condition.

Optionally, after the preset time period, the distance between the UE and the base station is 72 km. In response to the transmission distance between the UE and the base station being 72 km, the UE determines not to provide the transmission feedback for the downlink transmission with the UE as a destination address.

At S45, the UCI carrying information that the UE does not satisfy the distance effective condition is sent to the base station.

Optionally, the UE further sends the UCI carrying the information that the UE does not satisfy the distance effective condition to the base station.

At S46, it is determined to no longer monitor the transmission feedback sent by the UE based on the received UCI.

Optionally, the base station receives the UCI from the UE. The base station determines that the UE does not satisfy the distance effective condition based on the UCI, and no longer monitors the transmission feedback sent by the UE.

In the embodiment of the disclosure, it may be determined whether the UE provides the transmission feedback for the downlink transmission with the UE as the destination address based on the distance effective condition sent by the base station. Moreover, when it is determined that the UE does not need to provide the transmission feedback for the downlink transmission with the UE as the destination address, the base station is also notified, so that the base station no longer monitors the UE, thus the waste of wireless resources can be reduced.

Example 2

Figures 7, 8:
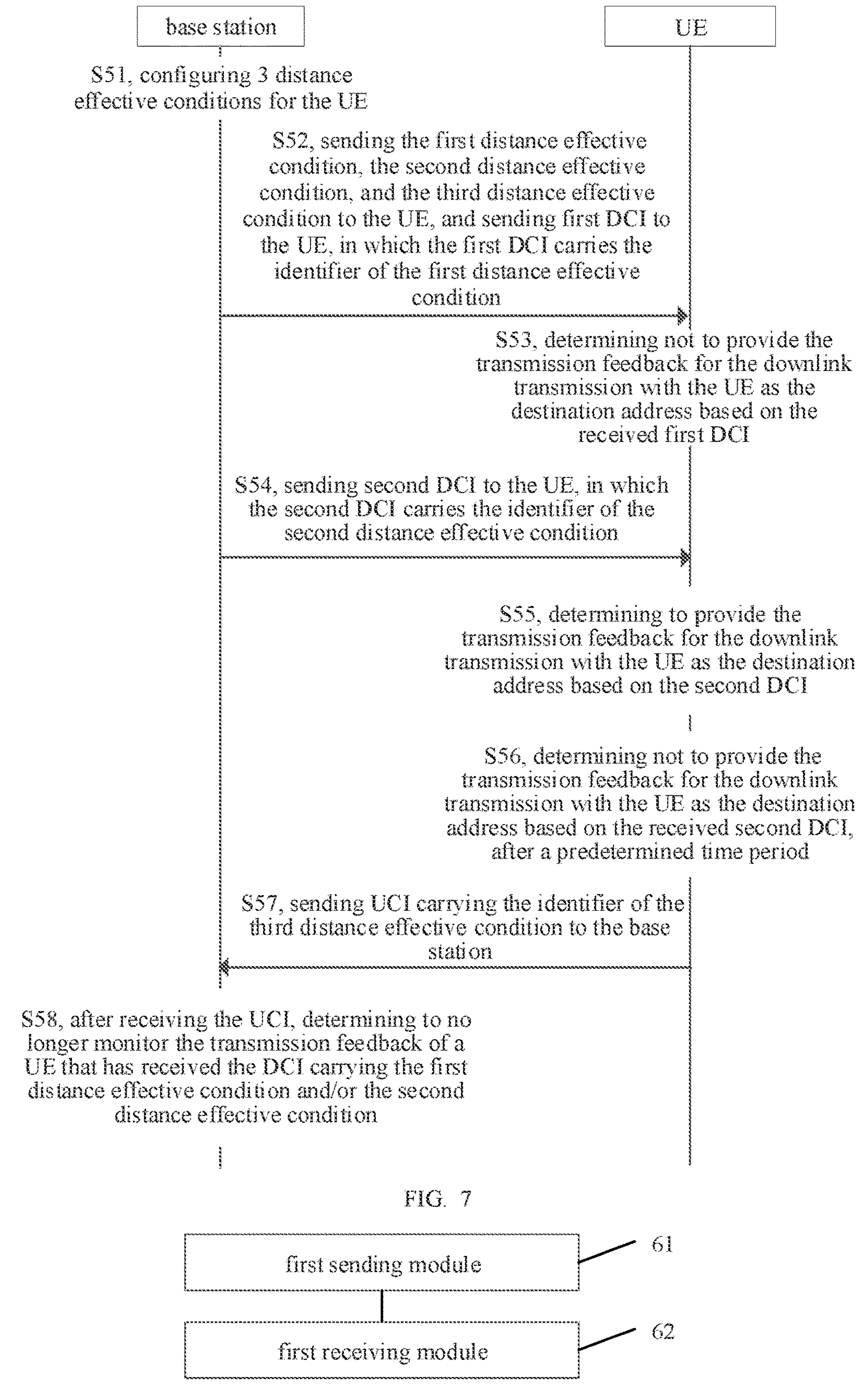
FIG. 7 is a schematic diagram of a method for scheduling data transmission according to an embodiment.
FIG. 8 is a block diagram of an apparatus for scheduling data transmission according to an embodiment.

As illustrated in FIG. 7, a method for scheduling data transmission, applicable to a system for scheduling data transmission is provided. The system includes: a base station and a UE. The method includes the following steps at S51-S58.

At S51, three distance effective conditions are configured for the UE.

The three distance effective conditions are the first distance effective condition, the second distance effective condition and the third distance effective condition, the identifier of the first distance effective condition is "00", and the identifier of the second distance effective condition is "01", and the third distance effective condition is "10".

The first distance effective condition is that when the transmission distance between the UE and the base station is less than or equal to 70 km, the UE provides the transmission feedback for the downlink transmission with the UE as the destination address.

The second distance effective condition is that when the transmission distance between the UE and the base station is less than or equal to 80 km, the UE provides the transmission feedback for the downlink transmission with the UE as the destination address.

The third distance effective condition is that when the transmission distance between the UE and the base station is less than or equal to 90 km, the UE provides the transmission feedback for the downlink transmission with the UE as the destination address.

Optionally, the base station configures the three distance effective conditions for the UE, and the three distance effective conditions are the first effective condition, the second effective condition and the third effective condition.

At S52, the first distance effective condition, the second distance effective condition, and the third distance effective condition are sent to the UE, and first DCI is sent to the UE, in which the first DCI carries the identifier of the first distance effective condition in the first DCI.

The identifier of the first distance effective condition carried in the first DCI is used to instruct the UE to determine whether to provide the transmission feedback for the downlink transmission with the UE as the destination address based on the first distance effective condition.

Optionally, the base station sends the first distance effective condition, the second distance effective condition, the third distance effective condition and the first DCI to the UE, wherein the first DCI carries the identifier "00" of the first distance effective condition.

At S53, it is determined not to provide the transmission feedback for the downlink transmission with the UE, as the destination address based on the received first DCI.

Optionally, the UE receives the first distance effective condition, the second distance effective condition, the third distance effective condition and the DCI sent by the base station. In response to the transmission distance between the UE and the base station being 75 km, it is determined that the UE does not satisfy the first distance effective condition, and the UE does not provide the transmission feedback for the downlink transmission with the UE as the destination address.

At S54, second DCI is sent to the UE, in which the second DCI carries the identifier of the second distance effective condition.

Optionally, the base station sends the second DCI to the UE. The second DCI carries the identifier "01" of the second distance effective condition. The identifier of the second distance effective condition carried in the second DCI is used to instruct the UE to determine whether to provide the transmission feedback fir the downlink transmission with the UE as the destination address based on the second distance effective condition.

At S55, it is determined to provide the transmission feedback for the downlink transmission with the UE as the destination address based on the second DCI.

Optionally, after the UE receives the second DCI, in response to the transmission distance between the UE and the base station being 75 km, it is determined that the UE satisfies the second distance effective condition, and it is determined that the UE provides the transmission feedback for the downlink transmission with the UE as the destination address.

At S56, after a predetermined time period, it is determined not to provide the transmission feedback for the downlink transmission with the UE as the destination address based on the received second DCI.

Optionally, after the predetermined time period has passed, the distance between the UE and the base station has reached 81 km, in response to the distance between the UE and the base station being 81 km and the second distance effective condition carried in the second DCI, it is determined that the UE does not satisfy the second distance effective condition, and it is determined that the UE does not provide the transmission feedback for the downlink transmission with the UE as the destination address.

At S57, the UCI carrying the identifier of the third distance effective condition is sent to the base station.

Optionally, the UE determines that, the UE at the current moment satisfies the third distance effective condition, and sends the UCI carrying the identifier of the third distance effective condition to the base station.

At S58, after receiving the UCI, it is determined to no longer monitor the transmission feedback of a UE that has received the DCI carrying the first distance effective condition and/or the second distance effective condition.

Optionally, after receiving the UCI, the base station determines to monitor only the transmission feedback of the UE that has received the DCI carrying the first distance effective condition and/or the second distance effective condition.

In the embodiment of the disclosure, it may be determined whether the UE provides the transmission feedback for the downlink transmission based on the multiple distance effective conditions sent by the base station and the identifiers of the distance effective conditions carried in the DCI. Moreover, for UEs that only carry part of the distance effective conditions and do not satisfy the distance effective conditions, the base station is also informed to no longer monitor these UEs, thus reducing the waste of wireless resources.

As illustrated in FIG. 8, an apparatus for scheduling data transmission, applicable to a base station is provided. The apparatus includes: a first sending module 61. The first sending module 61 is configured to send feedback indication information to a UE, in which the feedback indication information is configured to indicate whether the UE provides a transmission feedback for a downlink transmission with the UE as a destination address.

In some embodiments, the first sending module 61 is further configured to: send an effective condition for the feedback indication information to the UE.

In some embodiments, the first sending module 61 is further configured to: send a RRC reassignment message carrying the effective condition to the UE; or, broadcast a system message carrying the effective condition.

In some embodiments, the first sending module 61 is further configured to: issue DCI carrying an identifier of the effective condition.

In some embodiments, the effective condition includes at least one of the following:

a distance effective condition, configured to validate the feedback indication information in response to a transmission distance between the UE and a base station being less than or equal to a distance threshold value;

a delay effective condition, configured to validate the feedback indication information in response to a transmission duration of the downlink transmission being less than or equal to a delay threshold value; or an area effective condition, configured to validate the feedback indication information in response to an area identifier of the UE being a preset area identifier.

In some embodiments, the apparatus further includes: a first receiving module 62, and the first receiving module 62 is configured to: receive UCI reported in response to the UE switching from satisfying the effective condition to not satisfying the effective condition; or, receive UCI reported in response to a plurality of effective conditions, and the UE switching from satisfying the effective conditions.

In some embodiments, the first sending module 61 is further configured to: send DCI to the UE, in which the DCI carries the feedback indication information indicating the UE provide a transmission feedback for the downlink transmission or the next downlink transmission for the UE.

Figures 9, 10:
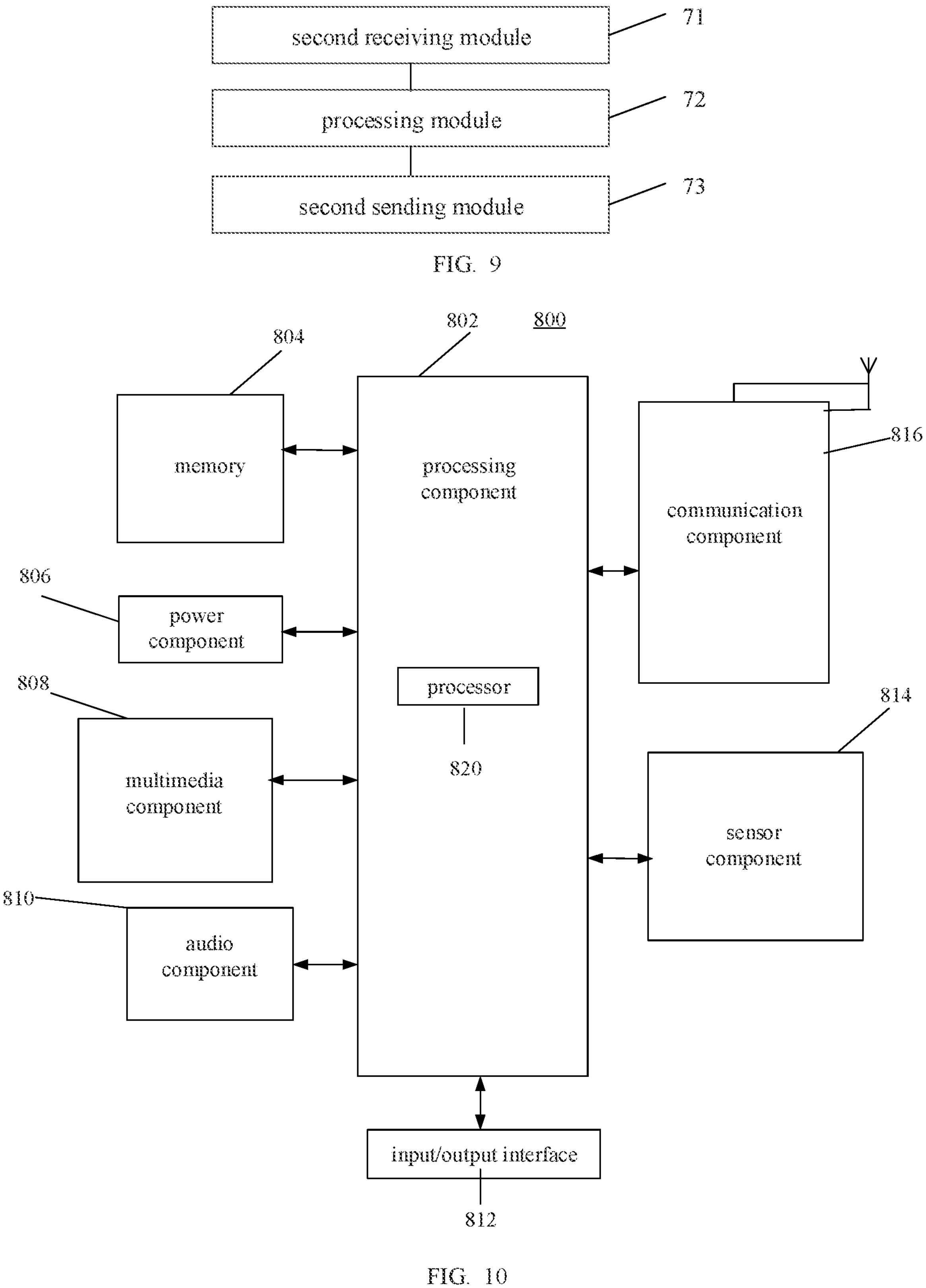
FIG. 9 is a block diagram of a device for scheduling data transmission according to an embodiment.
FIG. 10 is a block diagram of a UE according to an embodiment.

As illustrated in FIG. 9, an apparatus for scheduling data transmission, applicable to a UE is provided. The apparatus includes: a second receiving module 71 and a processing module 72. The second receiving module 71 is configured to receive feedback indication information from a base station. The processing module 72 is configured to determine whether to provide a transmission feedback for a downlink transmission with the UE as a destination address based on the feedback indication information.

In some embodiments, the second receiving module 71 is further configured to: receive an effective condition for the feedback indication information from the base station.

In some embodiments, the second receiving module 71 is further configured to: receive a RRC reassignment message from the base station, in which the RRC reassignment message carries the effective condition: or, receive a system message broadcasted by the base station, in which the system message carries the effective condition.

In some embodiments, the second receiving module 71 is further configured to: receive DCI carrying an identifier of the effective condition from the base station.

In some embodiments, the effective condition includes at least one of the following:

a distance effective condition, configured to define the feedback indication information is validated in response to a maximum transmission distance between the UE and the base station being less than or equal to a distance threshold value;

a delay effective condition, configured to define the feedback indication information is validated in response to a maximum transmission duration of the downlink transmission being less than or equal to a delay threshold value; or an area effective condition, configured to define the feedback indication information is validated in response to an area identifier of the UE being a preset area identifier.

In some embodiments, the processing module 72 is further configured to: determine to provide the transmission feedback for the downlink transmission with the UE as the destination address, in response to a transmission distance between the UE and the base station being less than or equal to the distance threshold value in the distance effective condition; or, determine not to provide the transmission feedback for the downlink transmission with the UE as the destination address, in response to a transmission distance between the UE and the base station being greater than the distance threshold value in the distance effective condition.

In some embodiments, the processing module 72 is further configured to: determine to provide the transmission feedback for the downlink transmission with the UE as the destination address, in response to a transmission duration of the downlink transmission from the base station being less than or equal to the delay threshold value in the delay effective condition; or determine not to provide the transmission feedback for the downlink transmission with the UE as the destination address, in response to a transmission duration of the downlink transmission from the base station being greater than the delay threshold value in the delay effective condition.

In some embodiments, the processing module 72 is further configured to: determine to provide the transmission feedback for the downlink transmission with the UE as the destination address, in response to the area identifier of the UE being the preset area identifier in the effective condition; or, determine not to provide the transmission feedback for the downlink transmission with the UE as the destination address, in response to the area identifier of the UE not being the preset area identifier in the effective condition.

In some embodiments, the apparatus further includes: a second sending module 73, and the second sending module 73 is configured to: in response to the UE switching from satisfying the effective condition to not satisfying the effective condition, report UCI indicating that the UE does not satisfy the effective condition to the base station; or, in response to a plurality of effective conditions and the UE switching from satisfying the effective conditions, report UCI indicating that the UE satisfies the effective conditions to the base station.

In some embodiments, the second receiving module 71 is further configured to: receive DCI from the base station, in which the DCI carries the feedback indication information indicating the UE provide the transmission feedback for the downlink transmission or the next downlink transmission for the UE.

Regarding the apparatus in the above embodiments, the specific way in which each module performs its operation has been described in detail in the embodiments concerning the method, and will not be described in detail here.

According to the embodiments of the disclosure, a communication device is provided. The communication device includes: a processor; and a memory for storing instructions executable by the processor; in which, when the executable instructions are executed by the processor, the method for scheduling data transmission according to any one of the embodiments is implemented.

The communication device includes a base station or a user equipment.

The processor may include various types of storage medium that are non-transitory computer storage medium, which are capable of continuing to store information in the memory after the communication device is powered down.

The processor may be connected to a memory via a bus for reading executable programs stored on the memory, such as, at least one of the methods as shown in FIGS. 2 to 7.

The embodiments of the disclosure also provide a computer storage medium storing executable computer programs. When the computer programs are executed by a processor, a processing method for scheduling data transmission as described in any embodiment of the disclosure, such as, at least one of the methods as shown in FIGS. 2 to 7.

Regarding the apparatus in the above embodiments, the specific way in which each module performs its operation has been described in detail in the embodiments concerning the method, and will not be described in detail here.

FIG. 10 is a block diagram of a UE 800 according to an embodiment. For example, the UE 800 may be a mobile phone, a computer, a digital broadcasting terminal, a message transceiver device, a game console, a tablet device, a medical device, a fitness device and a personal digital assistant.

As illustrated in FIG. 10, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processor 820 to perform all or part of the steps in the above described method. Moreover, the processing component 802 may include one or more module which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 806 provides power to various components of the UE 800. The power component 806 may include a power management system, one or more power source, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensor to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or their combination. In an embodiment, the communication component 816 receives a broadcast signal or broadcast associated information from an external broadcast management system via a broadcast channel. In an embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In embodiments the UE 800 may be implemented with one or more Application Specific Integrated Circuit (ASIC) Digital Signal Processor (DSP), Digital Signal Processing Device (DSPD), Programmable Logic Device (PLD), Field Programmable Gate Array (FPGA), controller, micro-controller, microprocessor or other electronic components, for performing the above described method.

In embodiments, there is also provided a non-transitory computer readable storage medium including executable instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

Figure 11:
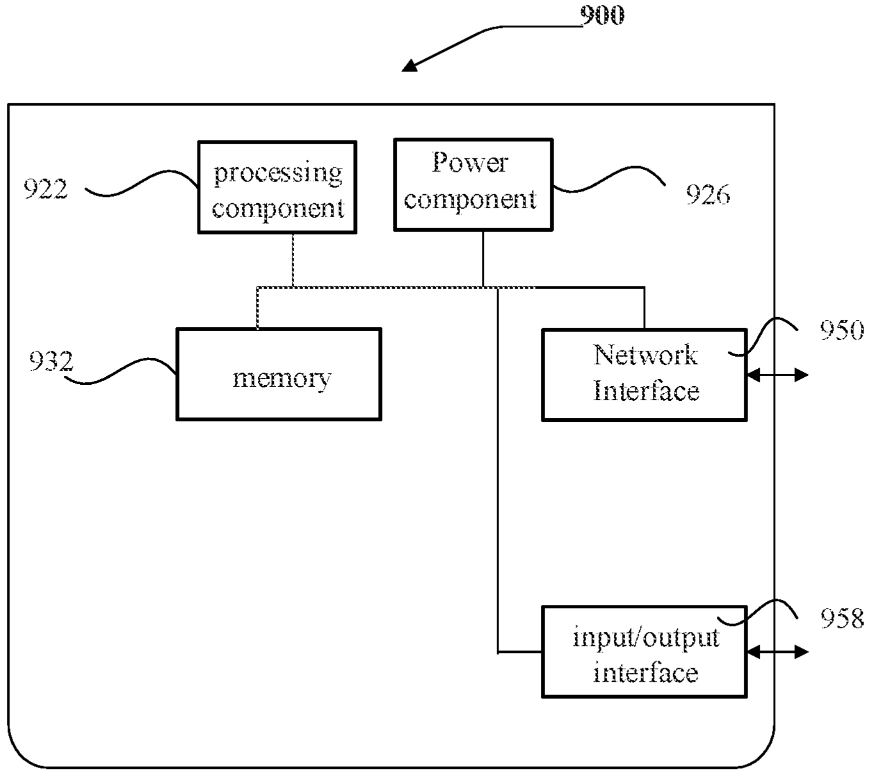
FIG. 11 is a block diagram of a base station according to an embodiment.

FIG. 11 illustrates a structure of a base station 900 according to an embodiment of the disclosure. For example, the base station 900 may be provided as a network side device. As illustrated in FIG. 11, the base station 900 includes a processing component 922, which includes one or more processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform any of the method described above and previously applied to the base station, for example, the method shown in FIGS. 2-3.

The base station 900 may also include a power component 926 configured to perform power management of the base station 900, a wired or wireless network interface 950 configured to connect the base station 900 to the network, and an I/O interface 958. The base station 900 may operate based on an operating system stored on the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles and including such departures from the disclosure as come within known or customary practice in the art. It is intended that the specification and examples be considered as exemplary, with a true scope of the disclosure being indicated by the following claims.

It will be appreciated that the disclosure is not limited to the exact construction that has been described above and illustrated in the accompanying drawings, and that various modifications and changes can be made without departing from the scope. It is intended that the scope of the disclosure be limited by the appended claims.

What is claimed is:

1. A method for scheduling data transmission, performed by a base station, comprising:

sending feedback indication information to a user equipment (UE), wherein the feedback indication information is configured to indicate whether the UE provides a transmission feedback for a downlink transmission with the UE as a destination address;

wherein sending the feedback indication information to the UE comprises: sending an effective condition for the feedback indication information to the UE, wherein the effective condition is used by the UE to determine whether or not to provide the transmission feedback for the downlink transmission with the UE as the destination address;

wherein sending the effective condition for the feedback indication information to the UE further comprises: sending downlink control information (DCI) carrying an identifier of the effective condition.

2. The method of claim 1, wherein sending the effective condition for the feedback indication information to the UE, comprises at least one of:

sending a radio resource control (RRC) reassignment message carrying the effective condition to the UE; or broadcasting a system message carrying the effective condition.

3. The method of claim 1, wherein the effective condition comprises at least one of:

a distance effective condition, configured to define the feedback indication information is validated in response to a transmission distance between the UE and the base station being less than or equal to a distance threshold value;

a delay effective condition, configured to define the feedback indication information is validated in response to a transmission duration of the downlink transmission being less than or equal to a delay threshold value; or an area effective condition, configured to define the feedback indication information is validated in response to an area identifier of the UE being a preset area identifier.

4. The method of claim 1, further comprising at least one of:

receiving uplink control information (UCI) reported in response to the UE switching from satisfying the effective condition to not satisfying the effective condition; or receiving UCI reported in response to determining there are a plurality of effective conditions and the UE switching from satisfying the effective condition.

5. The method of claim 1, wherein sending the feedback indication information to the UE, comprises:

sending the DCI to the UE, wherein the DCI carries the feedback indication information indicating the UE to provide the transmission feedback for the downlink transmission or a next downlink transmission for the UE.

6. A base station, comprising:

a processor; and a memory for storing instructions executable by the processor;

wherein the processor is configured to perform the method of claim 1.

7. A non-transitory computer storage medium having stored therein programs that, when executed by a processor, cause the processor to perform the method of claim 1.

8. A method for scheduling data transmission, performed by a user equipment (UE), comprising:

receiving feedback indication information from a base station; and determining, based on the feedback indication information, whether to provide a transmission feedback for a downlink transmission with the UE as a destination address;

wherein receiving the feedback indication information from the base station, comprises:

receiving an effective condition for the feedback indication information from the base station, wherein the effective condition is used by the UE to determine whether or not to provide the transmission feedback for the downlink transmission with the UE as the destination address; wherein an identifier of the effective condition is carried in downlink control information (DCI) from the base station.

9. The method of claim 8, wherein receiving the effective condition for the feedback indication information from the base station, comprises at least one of:

receiving a radio resource control (RRC) reassignment message from the base station, wherein the RRC reassignment message carries the effective condition; or receiving a system message broadcasted by the base station, wherein the system message carries the effective condition.

10. The method of claim 8, wherein the effective condition comprises at least one of:

a distance effective condition, configured to define the feedback indication information is validated in response to a maximum transmission distance between the UE and the base station being less than or equal to a distance threshold value;

a delay effective condition, configured to define the feedback indication information is validated in response to a maximum transmission duration of the downlink transmission being less than or equal to a delay threshold value; or an area effective condition, configured to define the feedback indication information is validated in response to an area identifier of the UE being a preset area identifier.

11. The method of claim 10, wherein determining, based on the feedback indication information, whether to provide the transmission feedback to the downlink transmission with the UE as the destination address, comprises:

determining to provide the transmission feedback for the downlink transmission with the UE as the destination address, in response to a transmission distance between the UE and the base station being less than or equal to the distance threshold value in the distance effective condition; or determining not to provide the transmission feedback for the downlink transmission with the UE as the destination address, in response to the transmission distance between the UE and the base station being greater than the distance threshold value in the distance effective condition.

12. The method of claim 10, wherein determining, based on the feedback indication information, whether to provide the transmission feedback for the downlink transmission with the UE as the destination address, comprises:

determining to provide the transmission feedback for the downlink transmission with the UE as the destination address, in response to a transmission duration of the downlink transmission from the base station being less than or equal to the delay threshold value in the delay effective condition; or determining not to provide the transmission feedback for the downlink transmission with the UE as the destination address, in response to the transmission duration of the downlink transmission from the base station being greater than the delay threshold value in the delay effective condition.

13. The method of claim 8, further comprising:

in response to the UE switching from satisfying the effective condition to not satisfying the effective condition, reporting uplink control information (UCI) indicating that the UE does not satisfy the effective condition to the base station; or in response to determining there are a plurality of effective conditions and the UE switching from satisfying the effective conditions, reporting UCI indicating that the UE satisfies the effective conditions to the base station.

14. The method of claim 8, wherein receiving the feedback indication information from the base station, comprises:

receiving the DCI from the base station, wherein the DCI carries the feedback indication information indicating the UE provide the transmission feedback for the downlink transmission or a next downlink transmission for the UE.

15. A non-transitory computer storage medium having stored therein programs that, executed by a processor, cause the processor to perform the method of claim 8.

16. A user equipment (UE), comprising:

a processor; and a memory for storing instructions executable by the processor;

wherein the processor is configured to:

receive feedback indication information from a base station, wherein receiving the feedback indication information from the base station comprises: receiving an effective condition for the feedback indication information from the base station, wherein the effective condition is used by the UE to determine whether or not to provide a transmission feedback for a downlink transmission with the UE as a destination address, wherein an identifier of the effective condition is carried in downlink control information (DCI) from the base station; and determine, based on the feedback indication information, whether to provide the transmission feedback for the downlink transmission with the UE as the destination address.

* * * * *